(12) United States Patent
Sato (10) Patent No.: US 11,595,533 B2
(45) Date of Patent: Feb. 28, 2023

(54) INFORMATION PROCESSING APPARATUS, CONTROL METHOD THEREOF, AND STORAGE MEDIUM

(71) Applicant: CANON KABUSHIKI KAISHA, Tokyo (JP)

(72) Inventor: Noriaki Sato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/667,583

(22) Filed: Feb. 9, 2022

(65) Prior Publication Data

US 2022/0294914 A1    Sep. 15, 2022

(30) Foreign Application Priority Data

Mar. 10, 2021    (JP) .............................. JP2021-038577

(51) Int. Cl.
   *H04N 1/60*    (2006.01)
   *H04N 1/00*    (2006.01)
   *H04N 1/32*    (2006.01)
   *H04N 1/34*    (2006.01)

(52) U.S. Cl.
   CPC ..... *H04N 1/00167* (2013.01); *H04N 1/00183* (2013.01); *H04N 1/32128* (2013.01); *H04N 1/344* (2013.01); *H04N 2201/3252* (2013.01)

(58) Field of Classification Search
   CPC .......... H04N 1/00167; H04N 1/00183; H04N 1/32128; H04N 1/344; H04N 2201/3252
   See application file for complete search history.

(56) References Cited

U.S. PATENT DOCUMENTS

2007/0024880 A1*    2/2007    Sato ......................... H04N 1/54
                                                                        358/1.9

FOREIGN PATENT DOCUMENTS

JP    2008-092576 A    4/2008

\* cited by examiner

*Primary Examiner* — Moustapha Diaby
(74) *Attorney, Agent, or Firm* — Carter, DeLuca & Farrell LLP

(57) ABSTRACT

An information processing apparatus includes a first developing unit configured to develop an image, a second developing unit by which a developed image better than a developed image developed by the first developing unit is obtained, an estimation unit configured to estimate an improvement effect of a quality of the developed image obtained using the second developing unit instead of the first developing unit, and a notification unit configured to notify content based on the improvement effect estimated by the estimation unit.

11 Claims, 10 Drawing Sheets

| | ID | 1 | 2 | 3 | 4 | 5 |
|---|---|---|---|---|---|---|
| SUPERVISORY DATA | NOISE CHARACTERISTICS IMPROVEMENT EFFECT | 0.8 | 1.3 | 0.4 | 2.6 | 0.5 |
| | SHARPNESS IMPROVEMENT EFFECT | 0.6 | 0.8 | 2.2 | 1.2 | 0.5 |
| | COLOR REPRODUCTION CHARACTERISTICS IMPROVEMENT EFFECT | 2.2 | 1.6 | 1.1 | 0.3 | 0.2 |
| | TONE REPRODUCTION CHARACTERISTICS IMPROVEMENT EFFECT | 0.2 | 2.3 | 0.5 | 1.4 | 0.8 |
| INPUT DATA | FILE NAME | img001 | img002 | img003 | img004 | img005 |
| | FILE PATH | ¥folder1 | ¥folder1 | ¥folder1 | ¥folder2 | ¥folder3 |
| | CAPTURED DATE | May 3rd 16:30 | Jun. 14th 4:23 | Nov. 5th 12:40 | Dec. 24th 13:04 | Dec. 25th 20:44 |
| | CAPTURED LOCATION | 35.5, 139.6 | 33.4, 131.7 | 37.7, 140.4 | 33.1, 129.8 | 35.9, 140.0 |
| | CAMERA NAME | Camera A | Camera A | Camera A | Camera B | Camera B |
| | FIRMWARE Ver | 1.0.0 | 1.0.3 | 1.2.0 | 1.0.0 | 1.0.0 |
| | LENS NAME | 50mm F1.8 | 24mm F1.4 | 24-70mm F4 | 18-55mm F5.6 | 18-55mm F5.6 |
| | FOCAL LENGTH | 50mm | 24mm | 35mm | 18mm | 55mm |
| | Av | 5.6 | 4 | 8 | 5.6 | 8 |
| | Tv | 1/100 | 1/2000 | 1/60 | 2 | 1/20 |
| | ISO | 800 | 1600 | 200 | 6400 | 400 |
| | EXPOSURE CORRECTION | ±0 | ±0 | -2 | +1 | ±0 |
| | NOISE REDUCTION | ON | ON | OFF | ON | ON |
| | SHARPNESS | ON | ON | ON | ON | ON |
| | PERIPHERAL ILLUMINATION CORRECTION | OFF | OFF | OFF | ON | ON |
| | CHROMATIC ABERRATION CORRECTION | ON | OFF | ON | ON | ON |
| | DISTORTION CORRECTION | OFF | OFF | OFF | OFF | OFF |
| | FLASH | OFF | ON | OFF | OFF | OFF |
| | ONLINE ALBUM | OFF | OFF | OFF | OFF | ON |
| | PRINT SERVICE | ON | OFF | OFF | OFF | ON |

INFORMATION PROCESSING APPARATUS, CONTROL METHOD THEREOF, AND STORAGE MEDIUM

BACKGROUND OF THE INVENTION

Field of the Invention

The present invention relates to a technique for development processing of image data.

Description of the Related Art

In recent years, with the development of image processing technology, it has become possible to obtain a detailed development result with less noise than before when developing RAW image data. However, among development processing methods for obtaining a good development result, there are development processing methods in which a computational load for the development processing is larger and cannot be realized by an imaging device.

Japanese Patent Laid-Open No. 2008-092576 discloses a technique for realizing, on a server on a network, a development processing method that cannot be realized by an imaging device. When the server receives an image, it determines whether or not the image has been developed on the server, and when the image is not an image developed on the server, the server overwrites the image with an image developed on the server.

However, in a technology disclosed in Japanese Patent Laid-Open No. 2008-092576, it is not known to what extent the quality of an image developed on the server exceeds the quality of an image developed in the imaging device unless the development processing is actually performed on the server. Since an image would be developed on the server even if the difference in the quality of the image when developed on the server and when developed in the imaging device is small, in some cases, the level of satisfaction with the improvement effect on image quality with respect to the usage fee paid for the server was low.

SUMMARY OF THE INVENTION

The present invention has been made in view of the above-described problems and provides an information processing system capable of selecting, as an image to be developed on a server, only an image for which an improvement effect on image quality is higher.

According to a first aspect of the present invention, there is provided an information processing apparatus comprising: at least one processor or circuit configured to function as: a first developing unit configured to develop an image; a second developing unit by which a developed image better than a developed image developed by the first developing unit is obtained; an estimation unit configured to estimate an improvement effect of a quality of the developed image obtained using the second developing unit instead of the first developing unit; a notification unit configured to notify content based on the improvement effect estimated by the estimation unit.

According to a second aspect of the present invention, there is provided a method of controlling an information processing apparatus, comprising: executing a first development in which an image is developed; executing a second development in which a developed image better than a developed image developed by the first development is obtained; estimating an improvement effect of a quality of the developed image obtained using the second development instead of the first development; and notifying content based on the improvement effect estimated by the estimation.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Figure 1:
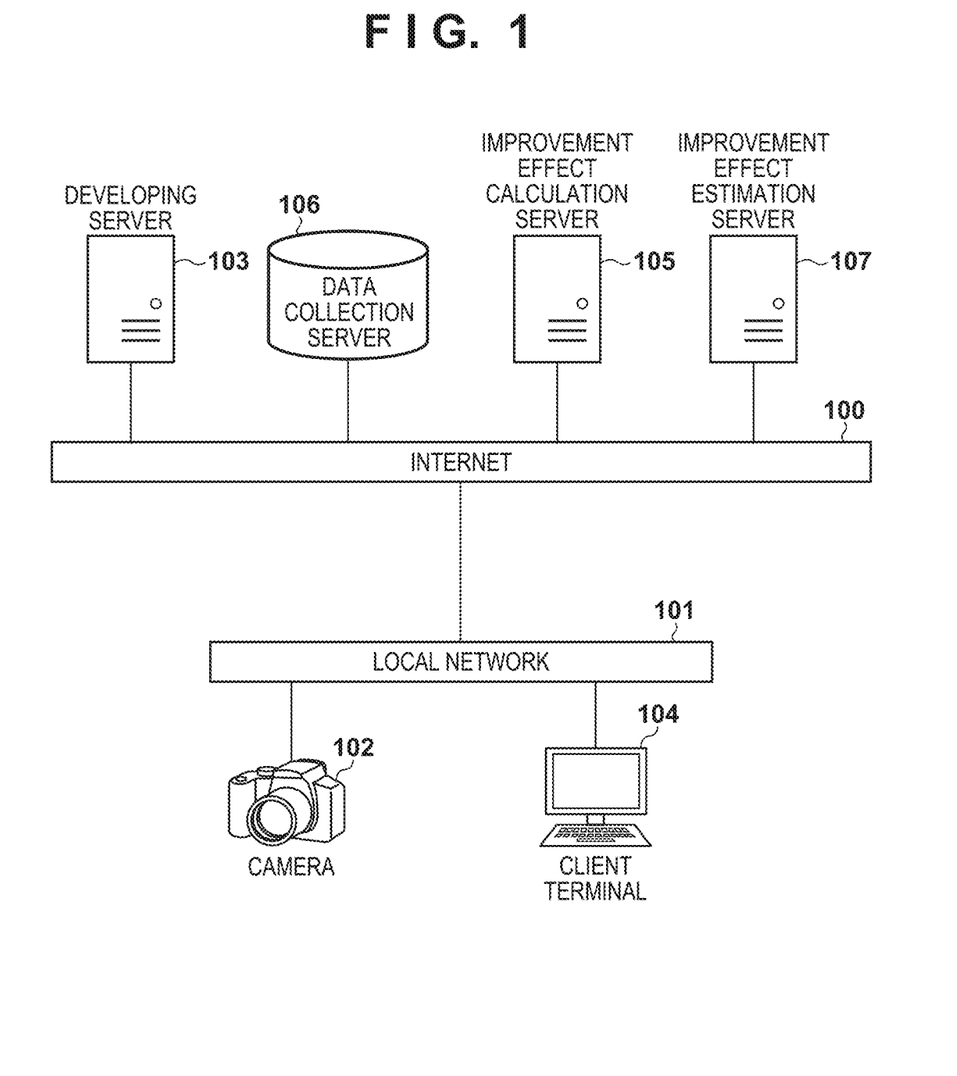
FIG. 1 is a diagram illustrating a configuration of an information processing system according to an embodiment of the present invention.

FIG. 1 is a diagram illustrating a configuration of an information processing system according to an embodiment of the present invention.

In FIG. 1, a digital camera 102 transmits RAW image data to a developing server 103 via Internet 100 and a local network 101. The developing server 103 is a server that develops image data received from the digital camera 102 and can provide the client terminal 104 with a better development result (developed image) than the digital camera 102.

An improvement effect calculation server 105 is a server that compares the development result of the digital camera 102 with the development result of the developing server 103 to calculate an improvement effect, associates the image that the developing server 103 received and the improvement effect, and stores it in the data collection server 106.

An improvement effect estimation server 107 is a server that estimates the improvement effect of the image to be developed by the developing server 103 and estimates the improvement effect based on the information stored in the data collection server 106. For example, the improvement effect estimation server 107 generates a learned model that outputs an improvement effect using supplementary information (detected information such as the type and distance of a detected subject, shooting information such as ISO sensitivity and an Av value, development information such as ON/OFF of optical correction, use history information for online albums and print services, etc.) on the received image or the received image stored in the data collection server 106 as input data and an improvement effect as supervisory data. Specifically, the improvement effect estimation server 107 associates a plurality of pieces of input data with the supervisory data and generates a learned model by learning using an SVM algorithm. The learned model may be generated in advance before operating the information processing system or may be generated again at a predetermined timing during the operation of the system. Since the improvement effect on an image may vary depending on the type of the digital camera 102, a more accurate estimation becomes possible by generating the learned model again while the system is running.

Figure 2A:
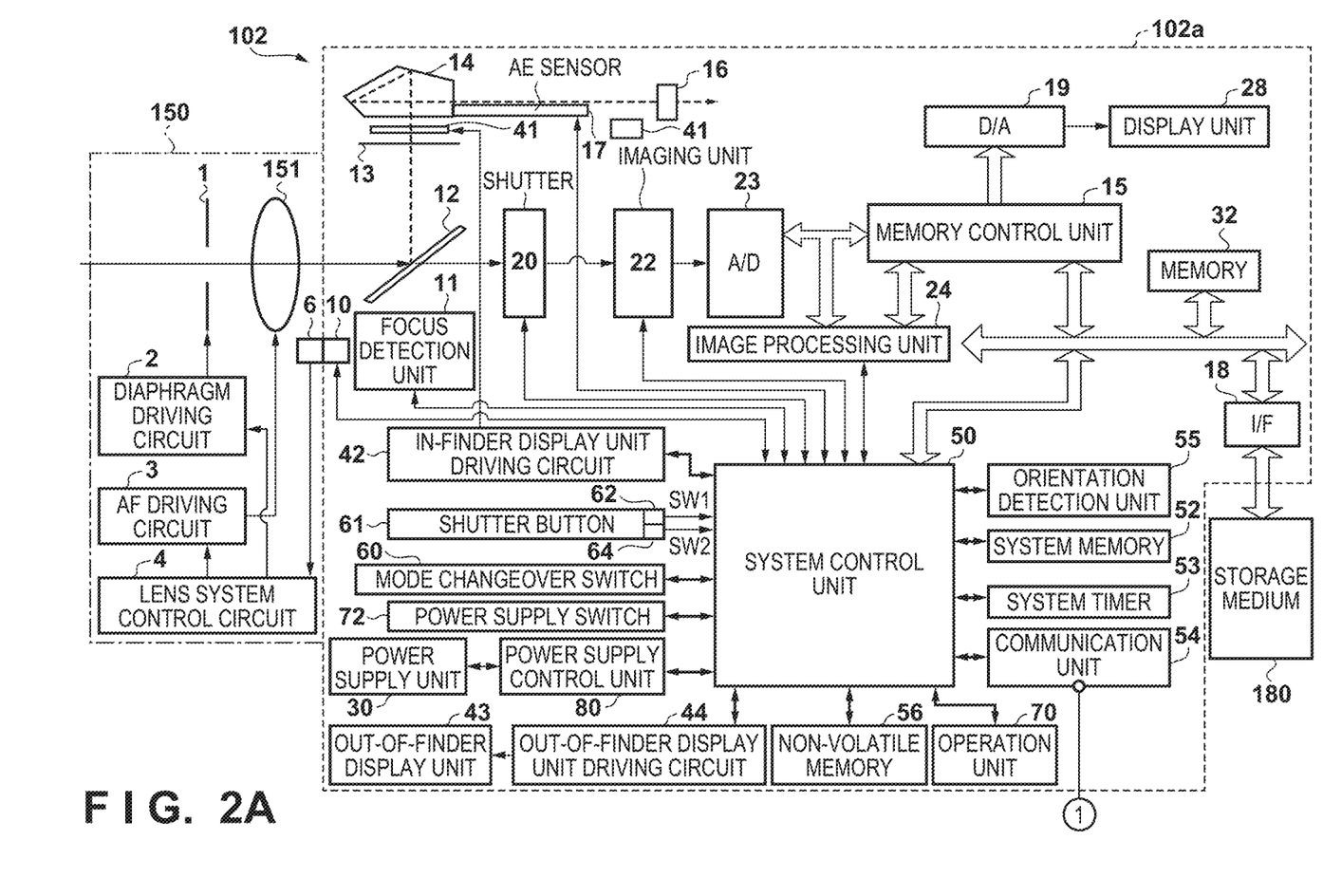
FIGS. 2A and 2B are diagrams illustrating a hardware configuration of each device constituting the information processing system illustrated in FIG. 1.
Figure 2B:
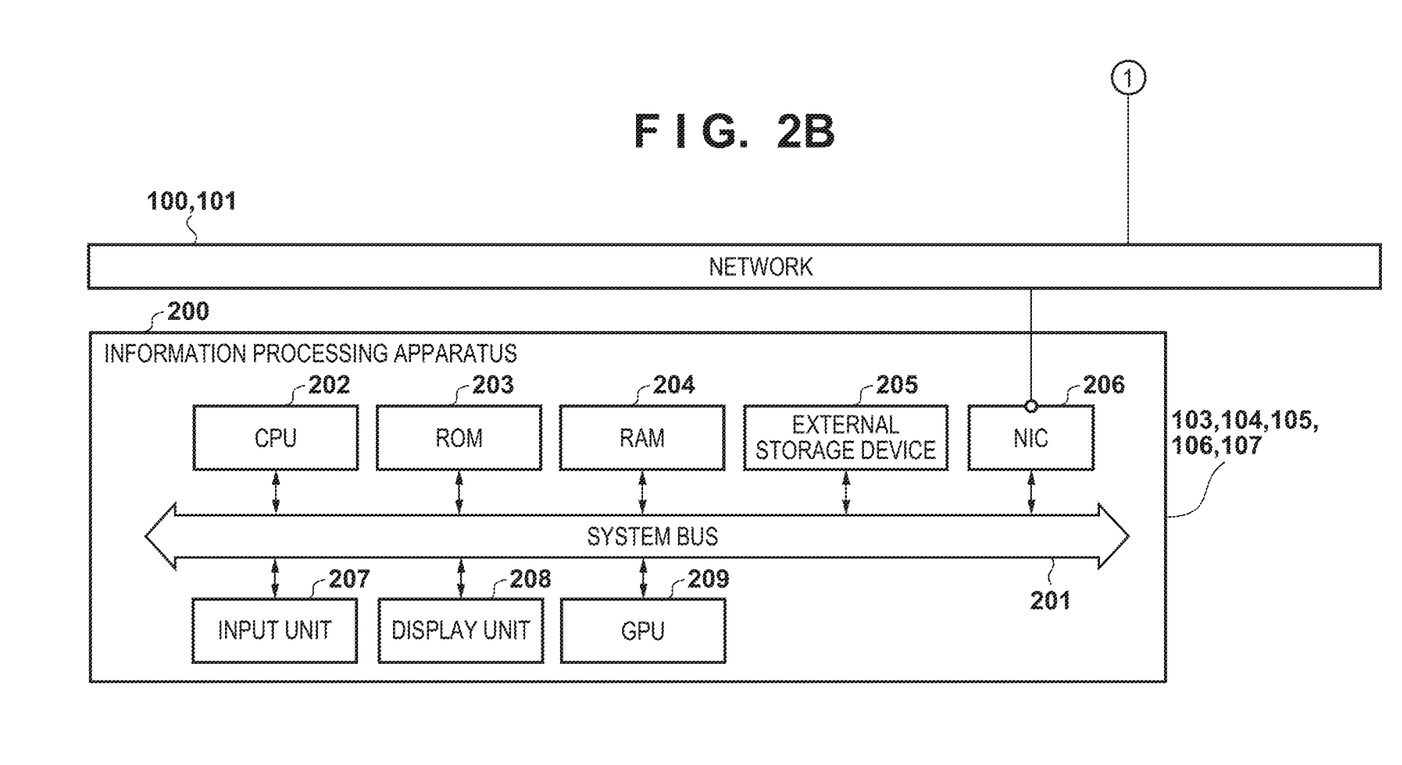

FIGS. 2A and 2B are diagrams illustrating a hardware configuration of each device constituting the information processing system illustrated in FIG. 1.

In FIGS. 2A and 2B, a lens unit 150 is a lens unit on which an optical system is mounted and is mounted to be interchangeable with respect to a camera body 102a of the digital camera 102. A lens 151 is usually configured by a plurality of lenses but is simplified here and is illustrated as only one lens. A communication terminal 6 is a communication terminal for the lens unit 150 to communicate with the camera body 102a, and the communication terminal 10 is a communication terminal for the camera body 102a to communicate with the lens unit 150. A lens system control circuit 4 communicates with a system control unit 50 of the camera body 102a via the communication terminals 6 and 10, controls a diaphragm 1 via a driving circuit 2, and changes the position of the lens 151 via an AF driving circuit 3 to adjust focus.

An AE sensor 17 measures the brightness of a subject through the lens unit 150. A focus detection unit 11 outputs defocus amount information to the system control unit 50. The system control unit 50 controls the lens unit 150 based on the defocus amount information and performs phase difference AF (autofocus).

A quick return mirror 12 (hereinafter, mirror 12) is raised and lowered by an actuator (not illustrated) based on an instruction from the system control unit 50 at the time of exposure, live view shooting, and moving image shooting. The mirror 12 is a mirror for switching a light beam that has entered from the lens 151 to a state in which it is guided to a viewfinder 16 and a state in which it is guided to the imaging unit 22. The mirror 12 is disposed to guide the light from the lens 151 to the viewfinder 16 by reflection at normal times; however, when shooting or when a live view display is performed, the mirror 12 springs upward to be retracted from the optical path (mirror-up) and guides the light beam to the imaging unit 22. Therefore, a live view shooting mode using a display unit 28 and an optical viewfinder shooting mode using the viewfinder 16 cannot be used at the same time. Further, the mirror 12 is a half-mirror whose central portion transmits some light, and a portion of the light beam is transmitted so as to be incident on the focus detection unit 11 for detecting focus.

A photographer, by observing a focusing screen 13 through a pentaprism 14 and the viewfinder 16, can confirm focus and composition of the optical image of a subject obtained through the lens unit 150.

A shutter 20 is a focal plane shutter for controlling an exposure time of the imaging unit 22 under the control of the system control unit 50.

The imaging unit 22 has an image sensor configured by a CCD, a CMOS sensor, or the like for converting an optical image into electric signals. An A/D converter 23 converts analog image signals outputted from the imaging unit 22 to digital image data.

An image processing unit 24 performs predetermined pixel interpolation, resizing processing such as reduction, and color conversion processing on data from the A/D converter 23 or data from a memory control unit 15. Further, the image processing unit 24 performs predetermined computational processing using the captured image data, and the system control unit 50 performs exposure control and ranging control based on the obtained calculation result. Thus, AF (autofocus) processing, AE (auto-exposure) processing, EF (pre-flash) processing of a TTL (through the lens) method is performed. The image processing unit 24 further performs predetermined computational processing using the captured image data and also performs AWB (auto white balance) processing of a TTL method based on the obtained calculation result.

The data outputted from the A/D converter 23 is written, directly in a memory 32, via the image processing unit 24 and the memory control unit 15 or via the memory control unit 15. The memory 32 stores the image data obtained by the imaging unit 22 and then converted into digital data by the A/D converter 23 and the image data to be displayed on the display unit 28. The memory 32 has a storage capacity sufficient for storing a predetermined number of still images and a predetermined length of time of moving images and audio.

Further, the memory 32 also serves as a memory (video memory) for image display. A D/A converter 19 converts the data for image display stored in the memory 32 into analog signals and then supplies them to the display unit 28. The image data for display thus written in the memory 32 is displayed by the display unit 28 via the D/A converter 19. The display unit 28 performs display on a display such as an LCD according to the analog signal from the D/A converter 19. An electronic viewfinder function is realized by converting the digital signals A/D-converted once by the A/D converter 23 and then stored in the memory 32 into analog signals in the D/A converter 19, sequentially transferring them to the display unit 28, and then displaying them. Through-the-lens image display (live view display) can be performed using the electronic viewfinder function.

In an in-finder liquid crystal display unit 41, a frame (AF frame) indicating a focus detection area on which autofocus is currently being performed, an icon representing a setting state of the camera, or the like are displayed via an in-finder display unit driving circuit 42. In an out-of-finder liquid crystal display unit 43, various setting values of the camera including shutter speed and aperture are displayed via an out-of-finder display unit driving circuit 44.

A non-volatile memory 56 is an electrically erasable and recordable memory, and an EEPROM or the like is used, for example. In the non-volatile memory 56, constants for operation of the system control unit 50, programs, and the like are stored. Here, programs are programs for executing various flowcharts to be described later in the present embodiment.

The system control unit 50 controls the entire digital camera 102. By executing the programs recorded in the non-volatile memory 56 described above, each processing of the present embodiment described later is realized. A RAM is used in a system memory 52, in the system memory 52, constants and variables for operation of the system control unit 50, programs read from the non-volatile memory 56, and the like are deployed. The system control unit 50 also performs display control by controlling the memory 32, the D/A converter 19, the display unit 28, and the like.

A system timer 53 is a clock unit for measuring time used for various controls and time of a built-in clock. A mode changeover switch 60, a shutter button 61 having a first shutter switch 62 and a second shutter switch 64, and an operation unit 70 are operation means for inputting various operation instructions to the system control unit 50.

The mode changeover switch 60 switches the operation mode of the system control unit 50 to one of a still image recording mode, a moving image shooting mode, a playback mode, and the like. The modes included in the still image recording mode are an auto shooting mode, an auto scene discrimination mode, a manual mode, an aperture priority mode (Av mode), and a shutter speed priority mode (Tv mode). In addition, there are various scene modes, which are shooting settings for each shooting scene, a program AE mode, a custom mode, and the like. The mode changeover switch 60 can be directly switched to any of these modes. Alternatively, once a switch has been made with the mode changeover switch 60 to a screen of a list of shooting modes, any of the displayed plurality of modes may be selected using another operation member. Similarly, a plurality of modes may be included in the movie shooting mode.

The first shutter switch 62 is turned ON part way through the operation, a so-called half-press (shooting preparation instruction), of the shutter button 61 provided on the digital camera 102 and generates a first shutter switch signal SW 1. The first shutter switch signal SW 1 starts an operation such as AF (autofocus) processing, AE (auto-exposure) processing, AWB (auto white balance) processing, and EF (pre-flash) processing.

The second shutter switch 64 is turned ON when the operation of the shutter button 61 has been completed—a so-called fully press (shooting instruction)—and generates a second shutter switch signal SW 2, With the second shutter switch signal SW 2, the system control unit 50 starts an operation of a series of image capture processes from reading signals from the imaging unit 22 to writing image data to the storage medium 180.

Each operation member of the operation unit 70 is assigned an appropriate function for each scene by various function icons displayed on the display unit 28 and the like being selected and operated and functions as each type of function button. The function buttons include, for example, an end button, a return button, an image teed button, a jump button, a narrow-down button, an attribute change button, and the like. For example, when a menu button is pressed, various settable menu screens are displayed on the display unit 28. The user can perform various settings intuitively, using a menu screen displayed on the display unit 28 and four-directional up, down, left and right buttons and a SET button.

The operation unit 70 is various operation members serving as an input unit for receiving operations from the user.

The operation unit 70 includes the shutter button 61, a main electronic dial 71, a power supply switch 72, a sub-electronic dial 73, arrow keys 74, a SET button 75, an LV button 76, a zoom-in button 77, a zoom-out button 78, a playback button 79, an ISO setting button 81, a menu button 82, and the like.

A power supply control unit 80 includes a battery detection circuit, a DC-DC converter, a switch circuit for switching a block to be energized, and the like and detects whether or not a battery is mounted, the type of battery, the remaining battery amount, and the like. The power supply control unit 80 controls a DC-DC converter based on the detection result and an instruction from the system control unit 50 and supplies a required voltage for a required period to each unit including the storage medium 180.

A power supply unit 30 is configured by a primary battery such as an alkaline battery or a lithium battery; a secondary battery such as a NiCd battery, a NiMH battery, or a Li-ion battery; an AC adapter; and the like. A storage medium I/F 18 is an interface of the storage medium 180 such as a memory card or a hard disk. The storage medium 180 is a storage medium such as a memory card for recording a captured image and is configured by a semiconductor memory, a magnetic disk, or the like.

A communication unit 54 is connected by a wireless or wired cable and transmits and receives video and audio signals. The communication unit 54 can also be connected to a wireless LAN (Local Area Network) or the Internet. The communication unit 54 can transmit an image captured by the imaging unit 22 (including a through-the-lens image) and an image recorded on the storage medium 180 and can receive image data and various kinds of additional information from an external device.

An orientation detection unit 55 detects the orientation of the digital camera 102 with respect to the direction of gravity. Based on the orientation detected by the orientation detection unit 55, it is possible to determine whether an image captured by the imaging unit 22 is an image captured by holding the digital camera 102 horizontally or vertically. The system control unit 50 can add orientation information corresponding to the orientation detected by the orientation detection unit 55 to an image file of the image captured by the imaging unit 22 or can rotate an image and then record the image. An acceleration sensor, a gyro sensor, or the like may be used as the orientation detection unit 55.

Meanwhile, in FIGS. 2A and 2B, an information processing apparatus 200 is hardware configuring the developing server 103, the client terminal 104, the improvement effect calculation server 105, the data collection server 106, and the improvement effect estimation server 107 and may be implemented by a single information processing apparatus or may be implemented by distributing the functions between a plurality of information processing apparatuses as necessary. When a configuration of a plurality of information processing apparatuses is taken, the information processing apparatuses are connected by a Local Area Network (LAN) or the like so as to be able to communicate with each other.

In FIGS. 2A and 2B, a system bus 201 connects each constituent device 202 to 209 of the information processing apparatus 200 to be able to communicate with one another. A CPU (Central Processing Unit) 202 is a control unit for controlling the entire information processing apparatus 200. A ROM (Read Only Memory) 203 is a memory for storing programs and parameters that do not need to be changed. A RAM (Random Access Memory) 204 is a memory for temporarily storing programs and data supplied from an external storage device, networks 100 and 101, and the like. An external storage device 205 is a storage device including a hard disk or a memory card provided in a fixed manner in the information processing apparatus 200, an optical disk a magnetic card, an optical card, or an IC card removable from the information processing apparatus 200, or the like.

A network interface (NIC) 206 is an interface for connecting the information processing apparatus 200 to lines such as the networks 100 and 101. An input unit 207 is an interface with an input device such as a pointing device or a keyboard that receives the user's operations and inputs various types of data. A display unit 208 is an interface with a display device such as a display for displaying data held by the information processing apparatus 200 or supplied data. A GPU 209 is a control unit that can perform efficient operations by processing more data in parallel. The GPU 209 is used when performing learning multiple times using a learning model such as deep learning.

Note that the subsequent processing is realized by the CPU 202 of the information processing apparatus 200 reading and starting up a program supplied from the external storage device 205, the network 100 or 101, or the like and controlling the various devices accordingly.

Figure 3:
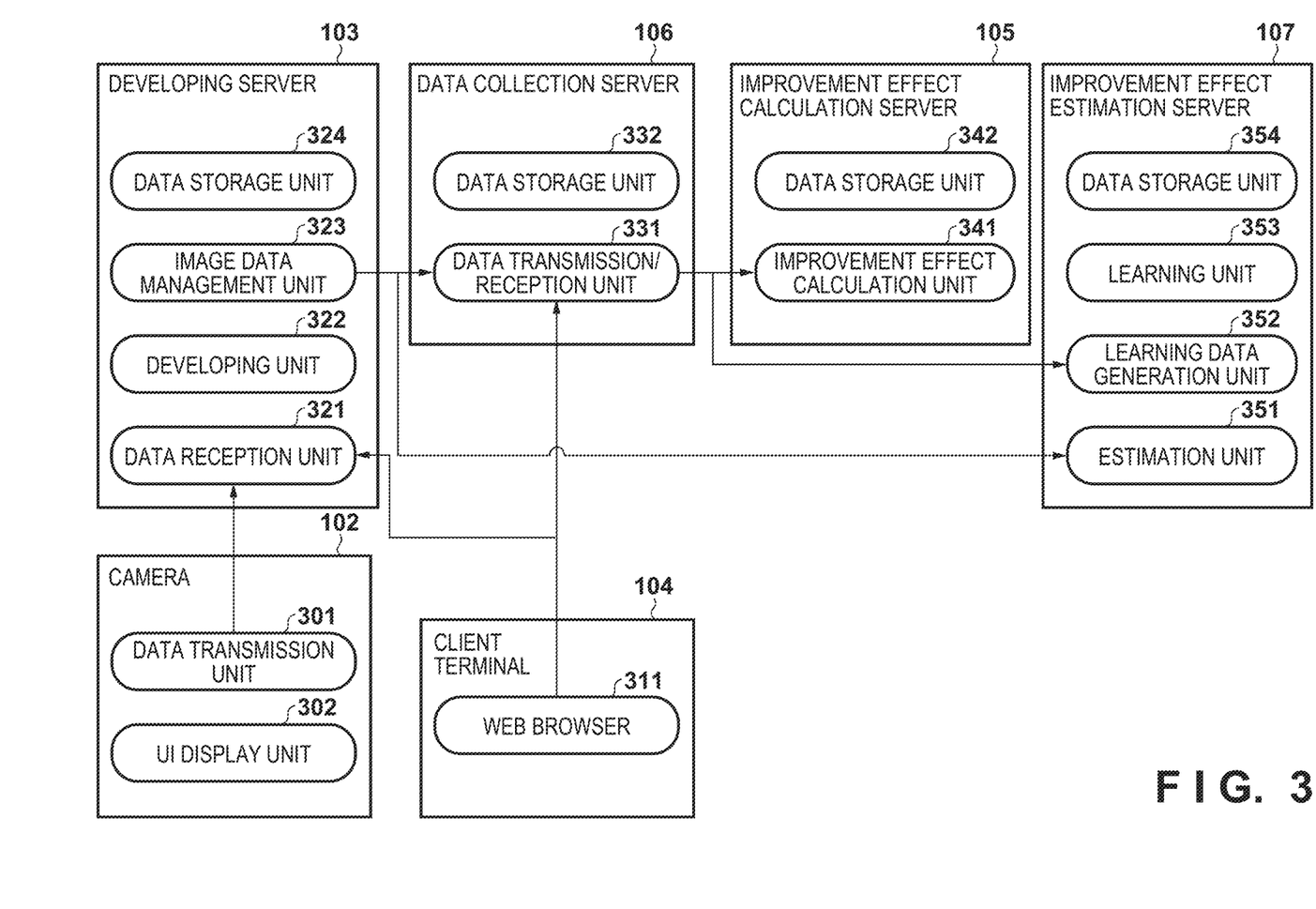
FIG. 3 is a diagram illustrating a software configuration realized by utilizing the hardware configuration of FIGS. 2A and 2B and programs.

FIG. 3 is a diagram illustrating a software configuration implemented by utilizing hardware resources illustrated in the hardware configuration diagram of FIGS. 2A and 2B and programs.

In FIG. 3, a data transmission unit 301 of the digital camera 102 transmits an image captured by the digital camera 102 and supplementary information. A UI display unit 302 is a display unit for displaying a user interface of the digital camera 102 and displays an image captured by the digital camera 102 and supplementary information.

A web browser 311 of the client terminal 104 instructs the developing server 103 to perform development. The web browser 311 is used, for example, to view images transmitted by the digital camera 102, select an image to be developed by the developing server 103, and pay a fee corresponding to the number of images to be developed, and the like. The web browser 311 can also perform an operation for accessing an external service not described in the system of FIG. 1, such as an operation for accessing the data collection server 106 and performing a setting for publishing to an external unit as well as an operation for transferring, to a print service.

A data reception unit 321 of the developing server 103 receives images and supplementary information from the digital camera 102. A developing unit 322 develops images received from the digital camera 102. The developing unit 322 is a development processing unit that can obtain a detailed development result with less noise than the development processing performed by the digital camera 102, and the image quality is improved by redeveloping the image of the digital camera 102 in the developing unit 322. An image data management unit 323 manages images and supplementary information received from the digital camera 102 and the results of development in the developing unit 322. A data storage unit 324 reads out and temporarily stores programs stored in the external storage device 205 as well as store images and supplementary information received by the data reception unit 321 and the results of development by the developing unit 322.

A data transmission/reception unit 331 of the data collection server 106 stores, in a data storage unit 332, received images managed by the image data management unit 323, development results of the developing server 103, and the like.

An improvement effect calculation unit 341 of the improvement effect calculation server 105 calculates an improvement effect based on received images managed by the data collection server 106 and development results of the developing server 103 and then stores the result in the data collection server 106. A data storage unit 342 stores a method of calculating an improvement effect. The improvement effect is evaluated using at least one measure such as noise characteristics, sharpness, color reproduction characteristics, and tone reproduction characteristics measured using an existing technology.

An estimation unit 351 of the improvement effect estimation server 107 estimates an improvement effect obtained when a received image managed by the image data management unit 323 is developed by the developing server 103 using a learned model learned in the learning unit 353. A learning data generation unit 352 generates learning data using supplementary information (detected information such as the type and distance of a detected subject, shooting information such as ISO sensitivity and an Av value, development information such as ON/OFF of optical correction, use history for online albums and print services, etc.) on the received image or the received image stored in the data collection server 106 as input data and an improvement effect calculated in the improvement effect calculation server 105 as supervisory data. A learning unit 353 associates input data that the learning data generation unit 352 has generated with the supervisory data and generates a learned model by learning using an SVM algorithm. A data storage unit 354 stores the learning data generated by the learning data generation unit 352 and the learned model learned by the learning unit 353.

In the present embodiment, the GPU 209 is used in addition to the CPU 202 for processing performed by the learning unit 353. Specifically, when executing a learning program including a learning model, learning is performed by the CPU 202 and the GPU 209 cooperating to perform computation. Incidentally, the process of the learning unit 353 may be performed only by the CPU 202 or the GPU 209. Further, similarly to the learning unit 353, the processing of the estimation unit 351 may be performed using the GPU 209.

Figure 4:
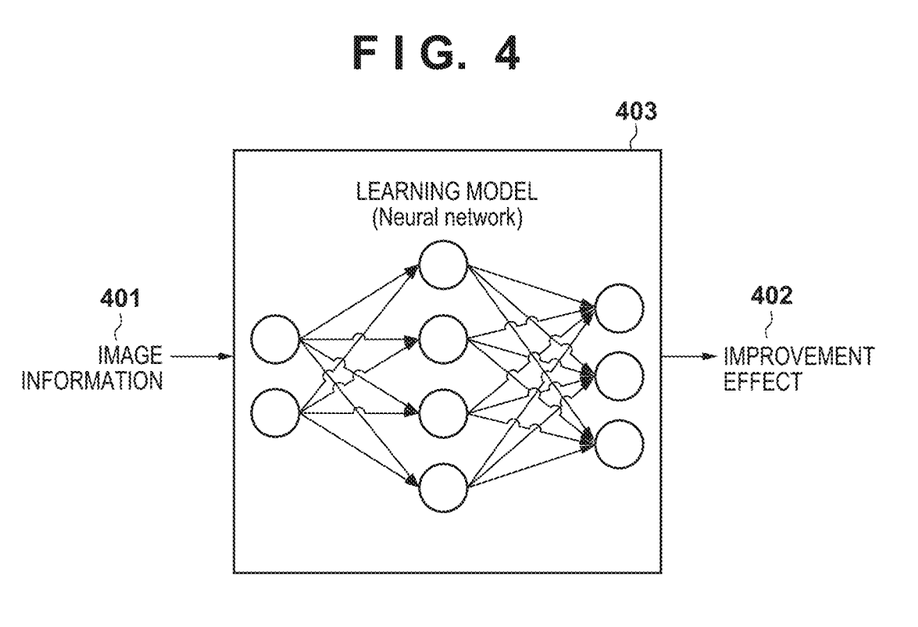
FIG. 4 is a schematic diagram illustrating an input and output structure which uses a learning model.

FIG. 4 is a conceptual diagram illustrating an input/output structure that uses a learning model of the present embodiment, and input data 401 is image information. For the input data. 401, supplementary information (detected information such as the type and distance of a detected subject, shooting information such as ISO sensitivity and an Av value, development information such as ON/OFF of optical correction, use history for online albums and print services, etc.) on the received image or the received image stored in the data collection server 106 is used. Output data 402 is similar to the improvement effect calculated by the improvement effect calculation server 105 and is a predicted value (estimated value) of the improvement effect obtained when the received image is developed by the developing server 103.

Figure 5:
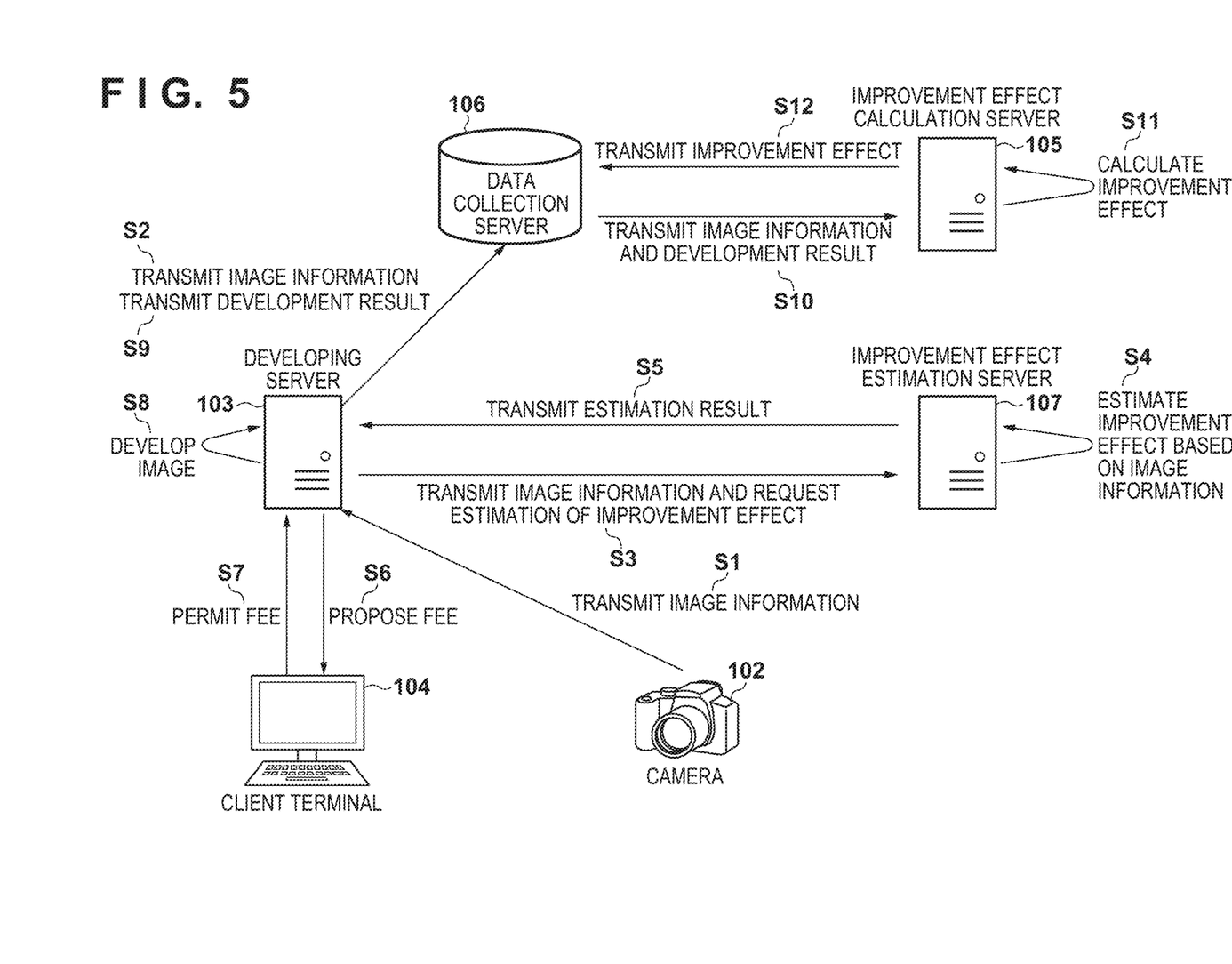
FIG. 5 is a diagram illustrating the operation of the information processing system utilizing a structure of the learning model.

FIG. 5 is a diagram explaining the operation of the information processing system utilizing the structure of the learning model illustrated in FIG. 4. When the digital camera 102 transmits image information to the developing server 103 as indicated in step S1, the developing server 103 stores the received image information in the data collection server 106 as indicated in step S2. Further, as indicated in step S3, the developing server 103 transmits the image information to the improvement effect estimation server 107 and requests estimation of an improvement effect. The improvement effect estimation server 107 estimates an improvement effect based on the received image information as indicated in step S4 and transmits (notifies) content based on the estimated improvement effect to the developing server 103 as indicated in step S5.

As indicated in step S6, when an estimated value of the improvement effect included in the received content based on the improvement effect exceeds a predetermined value, the developing server 103 transmits to the client terminal 104 that an improvement effect obtained when development is performed by the developing server 103 will be high and proposes charging a usage fee for the developing server 103. When transmitting to the client terminal 104 that the improvement effect will be high, not only that the improvement effect will be high or low but also the estimated value of the improvement effect itself may be transmitted specifically.

Further, the developing service of the developing system of the present embodiment may be provided to the user as a subscription service that can develop any number of images at a fixed amount of money up to a predetermined number of images in a given month. In this case, the developing server 103 may further propose a fee to the user for the usage fee of the developing server 103 based on whether or not there is space in the usage status of the developing server 103.

Figure 9A:
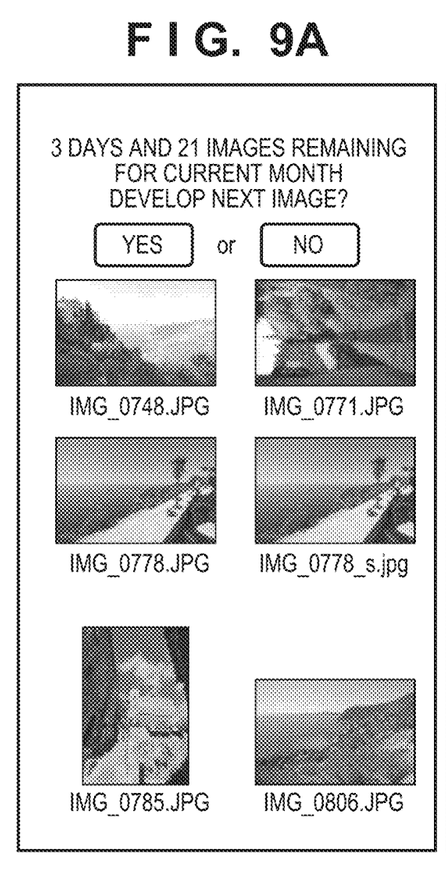
FIGS. 9A and 9B are diagrams illustrating examples of user interfaces.

The developing server 103 holds information indicating how many images have been developed for each user per month and when the number of images developed in the current month reaches a predetermined number, assumes that there is no space and proposes so as to prompt a pay-as-you-go system fee when performing additional development. In addition, if the number of images developed in the current month has not reached the predetermined number, it may be indicated how many sheets can be developed until the predetermined number is reached and prompt the user to take full advantage of the service. For example, as a result of the proposal, a GUI as illustrated in FIG. 9A is displayed on the client terminal 104. In a screen of FIG. 9A, it is indicated that 21 images can be developed until the predetermined number is reached. Also, in this proposal, images in which an improvement effect of at least a certain degree is expected are listed and proposed on the client terminal 104. This reduces the possibility of wasteful development processing performed by the developing server 103 than in a case where all images are listed, thereby enabling a more efficient use of the developing server 103.

When permission for a fee is obtained from the client terminal 104 as indicated in step S7, the developing server 103 develops the image as indicated in step S8. The developing server 103 stores the development result in the data collection server 106 as indicated in step S9, and the data collection server 106 transmits the image information and the development result to the improvement effect calculation server 105 and requests calculation of the improvement effect as indicated in step S10. As indicated in step S11, the improvement effect calculation server 105 calculates the improvement effect based on the received image information and development result. As indicated in step S12, the improvement effect calculation server 105 transmits the calculation result of the improvement effect to the data collection server 106, and the data collection server 106 stores the received improvement effect.

By performing the operation illustrated in FIG. 5, a high advertising effect with respect to the client terminal 104 is obtained. In addition, this configuration proposes developing only images with a high improvement effect by estimating the improvement effect. This configuration was made for the following reasons. That is, when the image received from the digital camera 102 is developed in advance by the developing server 103 and then a request for permission to charge a fee to the client terminal 104 is made, the usage fee for the developing server 103 incurred with respect to the image for which the permission is not obtained becomes a loss. On the other hand, when permission to charge a fee is requested to the client terminal 104 for an arbitrary image, the degree of customer satisfaction decreases for an image for which the difference between the development result of the digital camera 102 and the development result of the developing server 103 is small. In view of this, the improvement effect estimation server 107, which can be operated at a lower cost than the developing server 103, is used to estimate the improvement effect, and permission to charge a fee is only sought for images that are expected to have a high improvement effect, thereby improving customer satisfaction.

Figure 6:
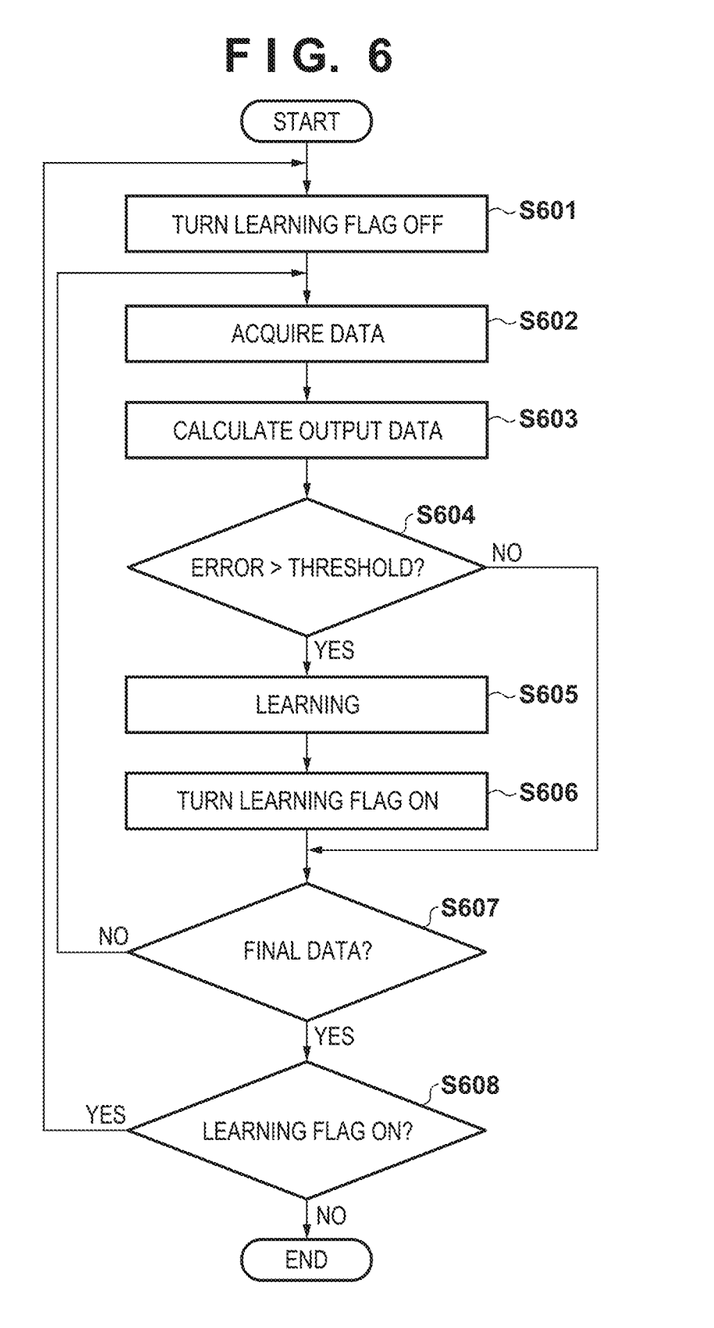
FIG. 6 is a flowchart illustrating a detailed flow of learning in a learning phase.

FIG. 6 is a flowchart illustrating a detailed flow of learning in the learning phase and illustrates an operation executed by the learning unit 353 of the improvement effect estimation server 107. Note that the learning unit 353 is implemented by the CPU 202 executing a program supplied from the external storage device 205, so in the following, description will be given assuming that the CPU 202 executes the respective operations.

Figure 7A:
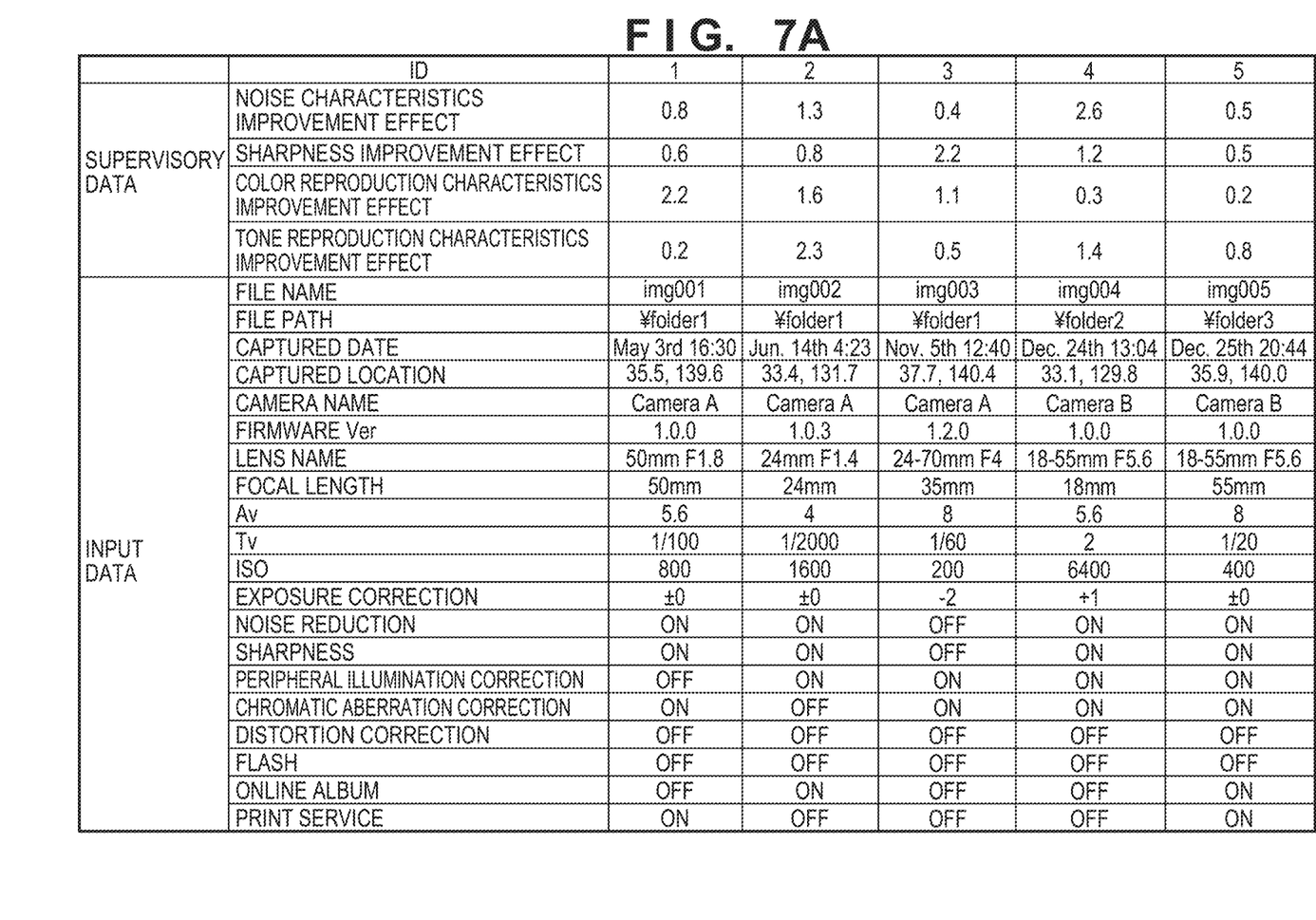
FIGS. 7A and 7B are diagrams illustrating an example of image information.
Figure 7B:
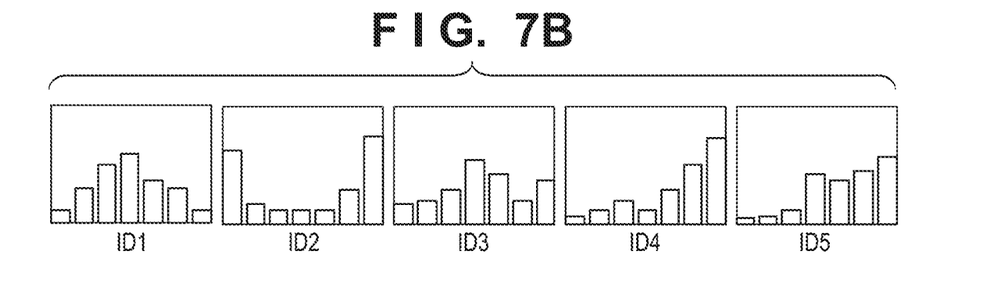

In step S601, the CPU 202 resets the learning flag to OFF, In step S602, the CPU 202 acquires image information such as that illustrated in FIG. 7A from the data collection server 106 and the improvement effect from the result of development in the camera obtained when the image of that image information is developed. The image information illustrated in FIG. 7A is supplementary information for images and a configuration is such that an image is acquired using a file name and a file path. FIG. 7B illustrates an example of learning by processing an image, which is input data, into a histogram.

In step S603, the CPU 202 instructs the estimation unit 351 to calculate the estimated value, which is the output data. In step S604, the CPU 202 compares the output data of the estimation unit 351 with the improvement effect obtained from the data collection server 106 and determines whether or not the difference (error) is greater than a predetermined threshold.

In step S604, the CPU 202 advances the process to step S605 when it is determined that the error is greater than the threshold (Yes in step S604), and advances the process to step S607 if it is determined otherwise (No in step S604).

In step S605, the CPU 202 performs learning using the image information acquired from the data collection server 106 as the input data and the improvement effect acquired from the data collection server 106 as the supervisory data. Concrete algorithms of machine learning include nearest neighbor method, naive Bayes method, decision tree, support vector machine, and the like. It also includes deep learning which uses a neural network to generate its own feature quantities and combine-weighting coefficients for learning. It is possible to apply, from these algorithms, algorithms that can be used to the present embodiment as appropriate. In step S606, the CPU 202 sets the learning flag to ON.

In step S607, the CPU 202 determines whether or not the data acquired in step S602 is the final data. In step S607, the CPU 202 advances the process to step S608 when it is determined that the data is final data (Yes in step S607) and returns the process to step S602 if it is determined that the data is not final data (No in step S607).

In step S608, the CPU 202 determines the learning flag, and if it is determined that the learning flag is ON (Yes in step S608), the process returns to step S601, and if it is determined that the learning flag is OFF (No in step S608), the process ends.

Incidentally, in the above, an example in which the data held in the data collection server 106 is sequentially acquired and learned has been indicated; however, step S604 and step S605 may be repeated until the error of the acquired data becomes smaller.

When the effect of noise reduction in the development processing of the developing server 103 is stronger than that of the digital camera 102, the noise characteristics improve, and thereby the numerical value of the improvement effect increases. Since the amount of noise generated is highly correlated with ISO sensitivity, the estimated value for an image of the improvement effect outputted by the improvement effect estimation server 107 increases as the ISO sensitivity increases.

Further, since the development processing of the developing server 103 always employs the latest technology, the numerical value of the improvement effect increases for an image as the release date of the digital camera 102 that captured the image and its firmware version become older. The estimation of the improvement effect outputted by the improvement effect estimation server 107 increases for an image as the release date of the digital camera 102 that captured the image and its firmware version become older.

In the above two examples, estimation that uses supplementary information of an image has been indicated, but the improvement effect of the tone reproduction characteristics is largely influenced by the features of an image. When a wider dynamic range than in the development result of the digital camera 102 can be reproduced by the development processing of the developing server 103, the improvement effect increases as the number of pixels in the dark portion and the vicinity of the saturated portion of the image increases. Such features of an image are also incorporated by the learning unit 353 into the learned data as in the histogram illustrated in FIG. 7B and are reproduced as the output of the estimation unit 351.

Figure 8:
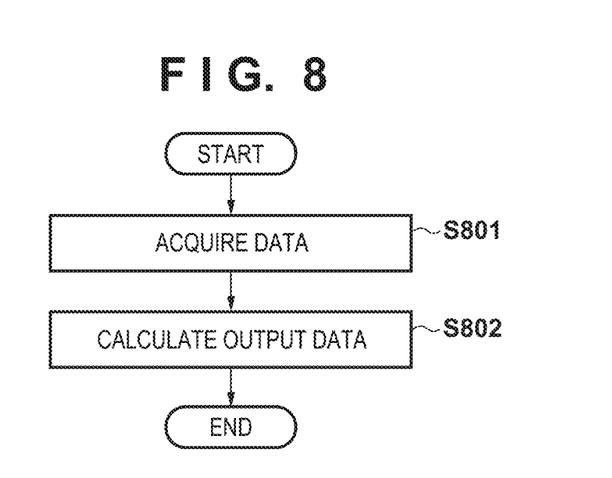
FIG. 8 is a flowchart illustrating a detailed flow of estimation in an estimation phase.

FIG. 8 is a flowchart illustrating a detailed flow of estimation in the estimation phase and illustrates operations executed by the estimation unit 351 of the improvement effect estimation server 107. Note that the estimation unit 351 is implemented by the CPU 202 executing a program supplied from the external storage device 205, so in the following, description will be given assuming that the CPU 202 executes the respective operations.

In step S801, the CPU 202 obtains an image and supplementary information from the developing server 103. In step S802, the CPU 202 estimates the improvement effect and then terminates the process.

Figure 9B:
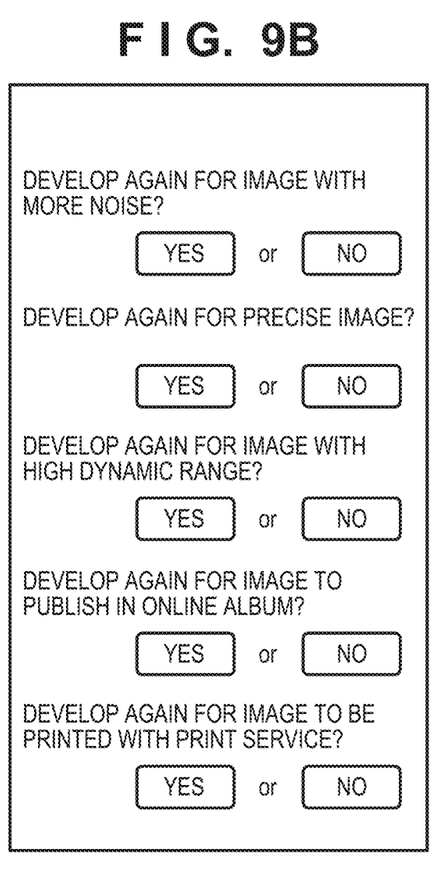

FIGS. 9A and 9B are diagrams illustrating UIs (User Interface) displayed on the client terminal 104.

FIG. 9A indicates a UI requesting authorization for charging a fee, and when "Yes" is selected, development begins in the developing server 103. This screen is displayed on the client terminal 104 in response to step S6 in FIG. 5. In the example of FIG. 9A, images estimated to be have a high improvement effect are listed and displayed. The user may instruct to develop all of these images or may select those that require higher development performance in view of the content of the images and instruct development. In this case, for example, a check mark is superimposed on images in response to inputting an instruction to select the images, and a message such as "Do you want to develop the selected images?" is displayed. In addition, if the user selects "YES", development processing can be performed by the developing server 103 only on the images that the user needs among the images estimated to have a high improvement effect.

FIG. 9B illustrates a UI that sets, in advance, permission to charge a tee and when a specified improvement effect can be obtained, development is started in the developing server 103 without displaying FIG. 9A. At this time, development may be started by the developing server 103 based on whether or not there is space in the usage status of the developing server 103.

Other Embodiments

Note that, of the above-described processing units, the estimation unit 351 executes the estimation process using a machine-learned model but the estimation unit 351 may perform rule-based processing such as a look-up table (LUT). In this case, for example, the relationship between an image and supplementary information, and an improvement effect is prepared in advance as an LUT. The created LUT may be stored in the data storage unit 354. When the processing of the estimation unit 351 is performed, the output data can be acquired by referring to the stored LUT. That is, LUT serves as a program for performing processing equivalent to that of the processing unit described above by operating in cooperation with a CPU, a GPU, or the like to perform processing of the processing unit described above.

The present invention provides a program for implementing one or more functions of the embodiments described above to a system or device via a network or a storage medium and can also be implemented in a process in which the computer of the system or device reads and executes the program. The computer may have one or more processors or circuits and may include a network of separate computers or separate processors or a network of circuits for reading and executing computer-executable instructions.

The processor or circuit may include a central processing unit (CPU), a micro processing unit (MPU), a graphics processing unit (GPU), an application specific integrated circuit (ASIC), and field programmable gateway (FPGA). The processor or circuit may also include a digital signal processor (DSP), a data flow processor (DFP), or a neural processing unit (NPU).

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage median may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-038577, filed Mar. 10, 2021 which is hereby incorporated by reference herein in its entirety.

What is claimed is:

1. An information processing apparatus comprising:
at least one processor or circuit configured to function as:
a first developing unit configured to develop an image;
a second developing unit by which a developed image better than a developed image developed by the first developing unit is obtained;
an estimation unit configured to estimate an improvement effect of a quality of the developed image obtained using the second developing unit instead of the first developing unit;
a notification unit configured to notify content based on the improvement effect estimated by the estimation unit;
a query unit configured to query a user as to whether or not to use the second developing unit upon receiving the notification of content based on the improvement effect from notification unit,
wherein the query unit queries the user as to whether or not to use the second developing unit based on whether or not there is space in a usage status of the second developing unit.

2. The information processing apparatus according to claim 1, wherein the query unit, in a case where an estimated value of the improvement effect included in the content based on the improvement effect notified from the notification unit exceeds a predetermined threshold, queries the user as to whether or not to use the second developing unit.

3. The information processing apparatus according to claim 1, wherein the query unit, in a case where an estimated value of the improvement effect included in the content based on the improvement effect notified from the notification unit exceeds a value that the user has set in advance, outputs an instruction to the second developing unit to perform development without querying the user as to whether or not to use the second developing unit.

4. The information processing apparatus according to claim 3, wherein the query unit further outputs an instruction to the second developing unit to perform development based on whether or not there is space in a usage status of the second developing unit.

5. The information processing apparatus according to claim 1, wherein the at least one processor or circuit is configured to further function as:
a calculation unit configured to calculate an improvement effect of a quality of the developed image developed by the second developing unit with respect to the developed image developed by the first developing unit.

6. The information processing apparatus according to claim 5, wherein the at least one processor or circuit is configured to further function as:
a learning unit configured to learn the improvement effect of the quality by the second developing unit using an image to be developed or supplementary information of that image as an input and the improvement effect calculated by the calculation unit as supervisory data.

7. The information processing apparatus according to claim 6, wherein the estimation unit estimates the improvement effect of the quality of the developed image that is obtained using the second developing unit instead of the first developing unit, using a learned model generated by the learning unit by learning the improvement effect of the quality by the second developing unit.

8. The information processing apparatus according to claim 6, wherein the supplementary information includes at least one of information on a type of a detected subject, information on a distance to the detected subject, information on an ISO sensitivity, information on an Av value, information on ON/OFF of optical correction, information on a use history of an online album, and information on a use history of a print service.

9. The information processing apparatus according to claim 1, wherein development processing by the second developing unit is development processing that involves a fee.

10. A method of controlling an information processing apparatus, comprising:
executing a first development in which an image is developed;
executing a second development in which a developed image better than a developed image developed by the first development is obtained;
estimating an improvement effect of a quality of the developed image obtained using the second development instead of the first development;
notifying content based on the improvement effect estimated by the estimation; and
querying a user as to whether or not to use the second development upon receiving the notification of content based on the improvement effect estimated by the estimation,
wherein the querying is executed based on whether or not there is space in a usage status of the second development.

11. A non-transitory computer readable storage medium operable to store a program for causing the information processing apparatus to execute a control method, the method comprising:
executing a first development in which an image is developed;
executing a second development in which a developed image better than a developed image developed by the first development is obtained;
executing an estimation in which an improvement effect of a quality of the developed image obtained using the second development instead of the first development is estimated; and
notifying content based on the improvement effect estimated by the estimations; and
querying a user as to whether or not to use the second development upon receiving the notification of content based on the improvement effect by the estimation,
wherein the querying is executed based on whether or not there is space in a usage status of the second development.

* * * * *